US 6,776,421 B2

(12) United States Patent
Florence et al.

(10) Patent No.: US 6,776,421 B2
(45) Date of Patent: Aug. 17, 2004

(54) FLUID SEALING SYSTEM

(75) Inventors: Jeremy D. Florence, Canton, MI (US); Kenneth John Hill, Saginaw, MI (US); Troy Michael Kinne, Midland, MI (US); Kenneth Joseph Seyuin, Bay City, MI (US); George E. Arlt, Midland, MI (US); David Michael Kubiak, Saginaw, MI (US); Michael L. Arrand, Davison, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/747,784

(22) Filed: Dec. 22, 2000

(65) Prior Publication Data

US 2002/0030327 A1 Mar. 14, 2002

Related U.S. Application Data

(60) Provisional application No. 60/181,462, filed on Feb. 10, 2000.

(51) Int. Cl.[7] .......................... F16L 33/16; F16L 17/06; F16L 39/00
(52) U.S. Cl. ....................... 277/602; 277/608; 277/912; 285/124.2; 285/124.3; 285/124.5
(58) Field of Search .................. 285/3, 4, 124.1–124.5, 285/FOR 118; 277/602, 607, 608, 616, 625, 606, 262, 917

(56) References Cited

U.S. PATENT DOCUMENTS

| | | | | |
|---|---|---|---|---|
| 1,519,018 A | * | 12/1924 | Boudreau | 24/279 |
| 4,732,397 A | * | 3/1988 | Gavin | 277/606 |
| 4,746,023 A | * | 5/1988 | Belter | 277/637 |
| 4,846,506 A | * | 7/1989 | Bocson et al. | 285/4 |
| 4,902,043 A | * | 2/1990 | Zillig et al. | 285/4 |
| 4,959,509 A | * | 9/1990 | Takeuchi et al. | 277/606 |
| 5,201,552 A | * | 4/1993 | Hohmann et al. | 285/120.1 |
| 5,301,707 A | * | 4/1994 | Hofsteenge | 137/12 |
| 5,387,014 A | * | 2/1995 | Chevallier | 285/26 |
| 5,860,681 A | * | 1/1999 | Slais | 285/137.11 |
| 5,882,014 A | * | 3/1999 | Gavin | 277/602 |
| 5,954,345 A | * | 9/1999 | Svoboda et al. | 277/626 |
| 6,029,981 A | * | 2/2000 | Hawley et al. | 277/607 |
| 6,136,253 A | * | 10/2000 | Bennett | 264/328.1 |

FOREIGN PATENT DOCUMENTS

EP 593353 * 4/1994 ................. 285/118

OTHER PUBLICATIONS

"Breakaway Seal", *Machine Design*, Sep. 12, 1996, p. 40.

* cited by examiner

Primary Examiner—Anthony Knight
Assistant Examiner—Michael J. Kyle
(74) Attorney, Agent, or Firm—Michael D. Smith

(57) ABSTRACT

A fluid sealing system constructed according to the invention includes a fluid housing having at least the fluid ports disposed in laterally fixed, parallel relation to one another. Within each port there is disposed a fluid seal. At least two associated fluid conduits are provided having distal ends which are extendible into their associated fluid ports into sealing engagement with the fluid seals. A retaining plate supports the conduits in laterally spaced, parallel relationship with one another in such a way that the conduits can move relative to one another in the lateral direction to enable the conduits to be installed together as a bundled unit while enabling for adjustment in the lateral spacing of the conduits during installation to achieve matched alignment between the spacing of the conduits and the fixed spacing of the fluid ports.

24 Claims, 7 Drawing Sheets

FLUID SEALING SYSTEM

CROSS REFERENCE TO RELATED APPLICATION

This application claims the benefit of U.S. Provisional Patent Application No. 60/181,462 filed Feb. 10, 2000, the disclosure of which is incorporated by reference herein in its entirety.

TECHNICAL FIELD

This invention relates to fluid sealing systems of the type in which one or more fluid conduits are extended into associated fluid ports of a fluid housing in which rupture membrane seals are accommodated to serve initially as shipping plugs but which rupture upon the insertion of the conduits to provide fluid communication between conduits and ports while sealing about the conduits.

BACKGROUND OF THE INVENTION

A typical motor vehicle hydraulic power steering gear includes a housing adapted for rigid attachment to a motor vehicle body, a fluid inlet port in the housing for a high pressure fluid conduit from a pump on the vehicle body, and a fluid discharge port for a low pressure fluid conduit from a reservoir on the vehicle body. Commonly, the steering gear housing is filled with hydraulic fluid at the site where the steering gear is manufactured to reduce the number of tasks which must be performed later when the steering gear is mounted on the vehicle body and the high and low pressure fluid conduits are connected to the inlet and discharge ports. To retain the hydraulic fluid in the steering gear housing, the fluid inlet and discharge ports are sealed closed by removable plastic plugs.

A breakaway seal manufactured by Acadia Polymers, Roanoke, Va., and described in "Breakaway Seal", *Machine Design*, Sep. 12, 1996, page 40, seals closed a fluid port in a motor vehicle automatic transmission case to prevent escape of fluid in the interval between manufacture of the automatic transmission and installation of the latter on a motor vehicle. The breakaway seal includes a metal carrier interference fitted in the fluid port, a tubular elastomeric gasket attached to the metal carrier, and an integral membrane perpendicular to a cylindrical inside wall of the tubular gasket. The integral membrane includes a plurality of radially oriented ribs, a plurality of relatively thin webs between the ribs, and a stiffener rib. When a distal end of a fluid conduit is thrust into the cylindrical inside wall of the tubular gasket, it ruptures the membrane to open the fluid port. At the same time, the cylindrical inside wall of the tubular gasket seals against a cylindrical outside wall of the fluid conduit to prevent escape of fluid between the gasket and the fluid conduit. While such a breakaway seal may function successfully in a motor vehicle transmission environment, it has not proven successful for sealing closed the fluid inlet and discharge ports in a motor vehicle hydraulic power steering gear housing. Specifically, because of dimensional changes necessary for application in a relatively space-restricted power steering gear housing environment, the "breaking" or rupture pattern of the integral membrane of the aforesaid breakaway seal causes inconsistent rupturing of the integral membrane and unpredictable insertion forces which sometimes are too great for easy manual connection of the high and low pressure fluid conduits to the inlet and discharge ports in the steering gear housing.

FIGS. 1a, 1b and 1c illustrate another prior art rupture seal in which a seal body is molded to an outer metal carrier. The mouth of the seal body is fully exposed to an inserted fluid conduit such that the carrier does not extend over the end face of the seal body. The membrane has a C-shaped tear line defining an inner tear flap inboard of the tear line and a hinge extending between spaced ends of the tear line connecting the tear flap to the membrane. The tear line comprises a thinned, rupturable section of the membrane. One drawback with this design is that the ends of the tear line are susceptible to tear propagation into the hinge region which could cause separation of the tear flap from the membrane. It is also difficult to control the insertion force necessary to rupture the C-shaped tear line, and a conduit must be extended a considerable distance into the port against the membrane before tearing begins which, in some applications, presents a problem where there is limited depth of the ports to receive the conduits.

Another consideration in such fluid sealing systems is the arrangement and presentation of the fluid conduits in applications where more than one fluid conduit is involved. The power steering pump application described above has a fluid supply conduit and a fluid return conduit. The conduits plug into fluid inlet and outlet ports, respectively, which are located adjacent one another on the pump housing in parallel, fixed orientation. Handling the fluid conduit individually is labor intensive. Bundling the conduits together with a rigid connecting plate saves on labor, but presents difficulties if the center-to-center spacing of the bundled conduits does not match up precisely with the center-to-center spacing of the fluid ports in which they are installed. Misalignment of the conduits relative to the ports can place unwanted stress on the port seals and could present fluid leakage problems.

A conduit fluid sealing system constructed according to the invention overcomes or greatly minimizes the foregoing deficiencies of the known prior systems.

SUMMARY OF THE INVENTION

A fluid sealing system constructed according to the invention includes a fluid housing having at least the fluid ports disposed in laterally fixed, parallel relation to one another. Within each port there is disposed a fluid seal. At least two associated fluid conduits are provided having distal ends which are extendible into their associated fluid ports into sealing engagement with the fluid seals. A retaining plate supports the conduits in laterally spaced, parallel relationship with one another in such a way that the conduits can move relative to one another in the lateral direction to enable the conduits to be installed together as a bundled unit while enabling for adjustment in the lateral spacing of the conduits during installation to achieve matched alignment between the spacing of the conduits and the fixed spacing of the fluid ports.

The invention thus has the advantage of simplifying the installation and reducing the labor and cost of connecting the fluid conduits by bundling them together as a unit while enabling relative lateral movement of the conduits for precise center-to-center alignment with the fixed positions of the fluid ports.

Another advantage of the present system is that the precise alignment insures proper alignment with the port seals and thus improves the overall sealing performance of the system.

The invention further provides improvements in the port seals to achieve improved sealing performance. Rupturable membrane seals are provided which, according to one aspect of the invention, incorporate a generally C-shaped pre-weakened tear seam defining a tear flap and hinge region. The hinge region is formed with a reinforcement rib to better control tearing of the membrane. According to another aspect of the invention, the membrane has tapered walls which extend axially inwardly of the port and converge at a tear seam, allowing for a sealing rib of the seal ahead of the tear seam to engage and seal about the conduit before rupturing of the seam, eliminating possible fluid leakage from the ports.

DESCRIPTION OF THE PREFERRED EMBODIMENTS

Figure 1A:
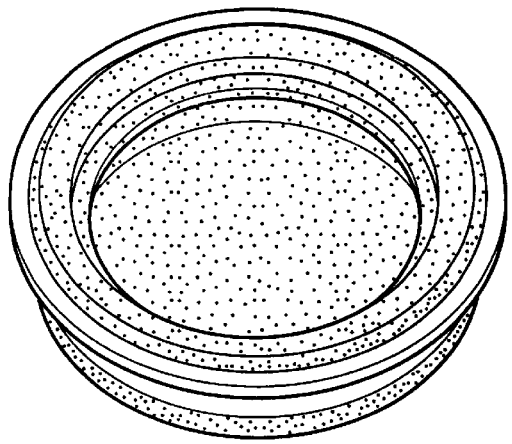
FIGS. 1a, 1b and 1c are perspective and cross-sectional view of a prior art seal having a membrane with a rupturable tear seam.
Figure 1B:
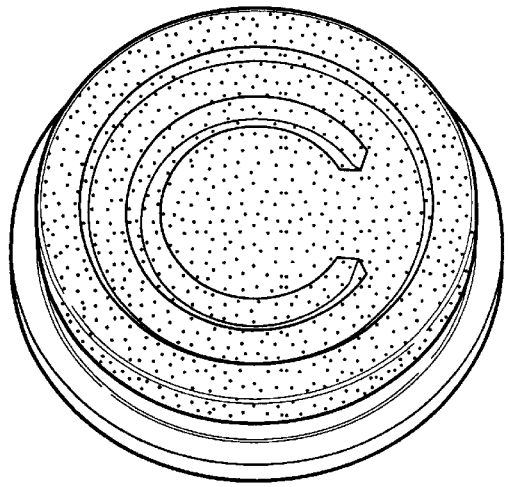
Figure 1C:
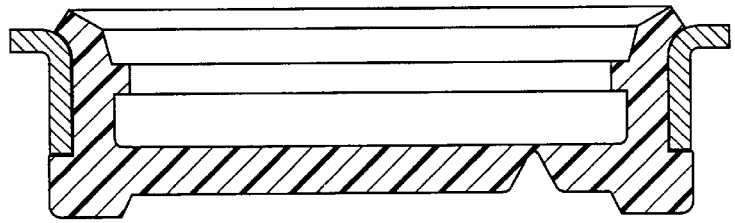
Figure 2:
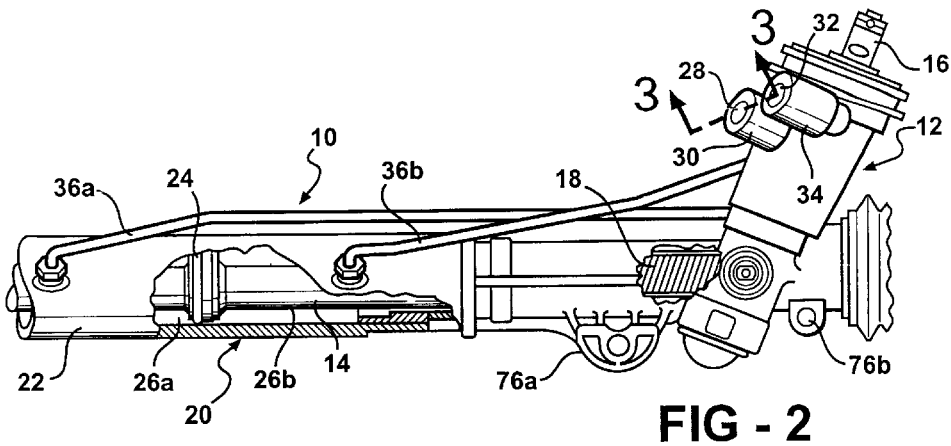
FIG. 2 is a fragmentary, partially broken-away view of a motor vehicle hydraulic power steering gear having a pair of breakaway seals according to one embodiment of this invention in fluid inlet and discharge ports in a housing of the steering gear.
Figure 3:
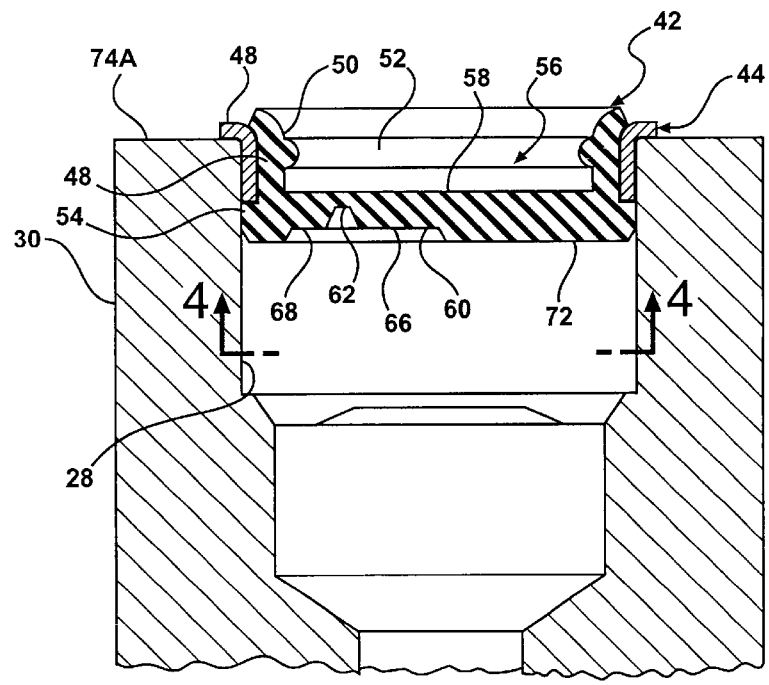
FIG. 3 is an enlarged sectional view taken generally along the plane indicated by lines 3—3 in FIG. 1 showing one of the break-away seals according to this invention.

Referring to FIGS. 2–3, a representative motor vehicle power steering gear 10 such as described in U.S. Pat. No. 4,454,804, issued Jun. 19, 1984 and assigned to the assignee of the this invention, the disclosure of which is incorporated herein by reference, includes a housing 12, a rack bar 14 supported on the housing for linear translation, and an input shaft 16 rotatably supported on the housing and connected to a steering hand wheel, not shown. A pinion gear, not shown, connected to the input shaft cooperates with a rack gear 18 on the rack bar in converting rotation of the input shaft 16 into back and forth linear translation of the rack bar to steer the motor vehicle in conventional fashion.

Figure 6:
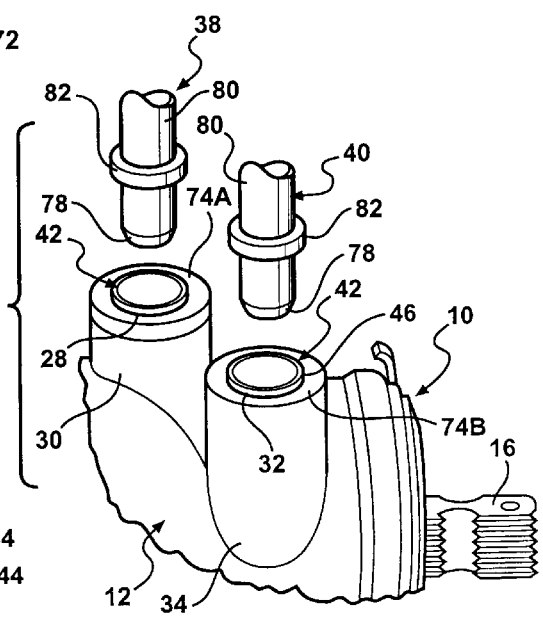
FIG. 6 is a fragmentary perspective view of a portion of FIG. 2 showing the pair of breakaway seals according to this invention and a pair of fluid conduits for connection to the fluid inlet and discharge ports.

A steering assist fluid motor 20 of the steering gear 10 supplements manual effort applied at the aforesaid steering hand wheel and includes a cylinder tube 22 rigidly attached to the steering gear housing around the rack bar and a piston 24 on the rack bar which divides the cylinder tube into a pair of working chambers 26A,26B. A cylindrical fluid inlet port 28 in a boss 30 on the steering gear housing and a cylindrical fluid discharge port 32 in a boss 34 on the steering gear housing are selectively and alternately connected to the working chambers 26A,26B of the fluid motor 20 through respective ones of a pair of external pipes 36A,36B by a rotary control valve, not shown, in the steering gear housing between the input shaft 16 and the aforesaid pinion gear. The steering gear housing 12 and the working chambers 26A, 26B of the fluid motor are filled with hydraulic fluid where the steering gear 10 is manufactured to reduce the number of tasks which must be performed later when the steering gear is mounted on a support structure and when a high pressure fluid conduit 38 and a low pressure fluid conduit 40, FIG. 6, are connected to the inlet and discharge ports 28,32, respectively. To retain the fluid, each of the inlet and discharge ports is sealed closed by a breakaway seal 42 according to a first seal embodiment of this invention.

Figure 4:
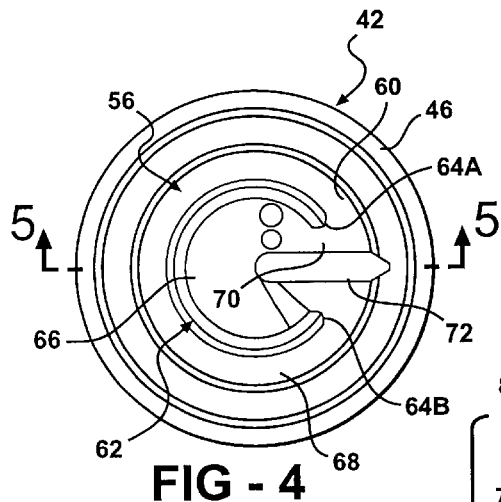
FIG. 4 is a view taken generally along the plane indicated by lines 4—4 in FIG. 3.
Figure 5:
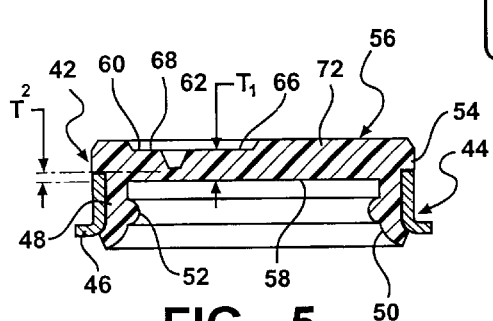
FIG. 5 is a sectional view taken generally along the plane indicated by lines 5—5 in FIG. 4.

As seen best in FIGS. 3–5, each breakaway seal 42 of the first embodiment includes a ring-shaped metal carrier 44 having an annular flange 46 at one end. The diameter of the metal carrier is calculated for interference fit in each of the inlet and the discharge ports 28,32. A tubular elastomeric gasket 48 of each breakaway seal 42 is attached to the metal carrier 44 thereof, e.g. bonded to or insert molded on the metal carrier, and includes a cylindrical inside body or wall 50 having an annular bead 52 therearound and a lip 54 over the end of the metal carrier opposite the flange 46.

Each breakaway seal 42 further includes a disc-shaped elastomeric membrane 56 integral with the tubular gasket 48 thereof perpendicular to the cylindrical inside wall 50 of the tubular gasket. Each integral membrane 56 has a wall thickness dimension "$T_1$", FIG. 5, between an upper surface 58 thereof and a lower surface 60 thereof. Each lower surface 60 is interrupted by a C-shaped groove or tear seam 62 in the integral membrane having a pair of laterally separated ends 64A,64B, FIG. 3. The thickness dimension $T_1$ of each integral membrane 56 is locally reduced by the C-shaped groove 62 therein to a substantially smaller web thickness dimension "$T_2$", FIG. 5, between the upper surface 58 of the membrane and the bottom of the C-shaped groove. Each C-shaped groove divides the corresponding integral membrane into a circular inner portion 66 inside of the groove and an annular outer portion 68 outside of the groove connected to the inner portion by an integral hinge 70 between the laterally separated ends 64A,64B of the groove. The wall thickness dimension $T_1$ of each integral membrane 56 is locally increased between the laterally separated ends 64A,64B of the C-shaped groove therein at an integral rib 72 radially traversing the hinge 70.

After the steering gear housing 12 and the steering assist fluid motor 20 are filled with hydraulic fluid where the steering gear 10 is manufactured, the fluid inlet and discharge ports 28,32 are sealed closed by the breakaway seals 42 by thrusting the metal carriers 44 thereof into the ports to a depth defined by engagement of the annular flanges 46 on the metal carriers against respective ones of a pair of annular seats 74A,74B on the bosses 30,34 around the inlet and the discharge ports. The breakaway seals are self-retained on the steering gear housing by the interference fits between the fluid inlet and discharge ports and the metal carriers which interference fits also prevent fluid leakage between the carriers and the fluid ports. The annular lips 54 on the tubular gaskets 48 resiliently bear against the fluid inlet and discharge ports to further prevent fluid leakage between the metal carriers and the fluid ports. At the same time, the integral membranes 56 across the cylindrical inside walls 50 of the tubular gaskets seal close the fluid inlet and discharge ports. With fluid thus sealed inside of the steering gear housing and the steering assist fluid motor, the steering gear 10 is transported from where it is manufactured to where it is installed on a motor vehicle or a subassembly thereof.

At the facility where the steering gear 10 is installed on a motor vehicle or a subassembly thereof, the steering gear housing 12 is fastened to a support structure, not shown, at respective one of a pair of mounting pads 76A,76B, FIG. 2, on the steering gear housing. Then, a distal end 78 of each of the high pressure fluid conduit 38 and the low pressure fluid conduit 40 is manually thrust into the cylindrical inside wall 50 of the tubular gasket of the breakaway seal in the corresponding one of the fluid inlet and discharge ports 28,32. As the high and low pressure fluid conduits are thrust into the tubular gaskets, the cylindrical inside walls 50 of the tubular gaskets and the annular beads 52 thereon slidingly and resiliently bear against a cylindrical outside wall 80 of the corresponding one of the fluid conduits. At the same time, the distal ends 78 of the fluid conduits engage the upper surfaces 58 of the integral membranes which membranes become progressively more tightly tensioned as the fluid conduits penetrate the tubular gaskets. The reduced web thickness dimensions $T_2$ of the integral membranes are calculated to induce local plastic deformation and rupture of the membranes at the bottoms of the C-shaped grooves 62 when the manual insertion forces applied to the fluid conduits attain predetermined magnitudes within a prescribed range suitable for manual installation of the fluid conduits. The reinforcement rib 72 stiffens the membrane in the vicinity of the hinge 70 and thereby transfers a greater concentration of force on the tear seam 62 than would otherwise be applied. The breaking pattern defined by each C-shaped groove 62 with the assistance of the rib 72 yields predictable and consistent rupture of the corresponding integral membrane within the aforesaid predetermined insertion force range. With the integral membranes 56 ruptured, the breakaway fluid seals 42 are open and fluid communication is established between the high and low pressure fluid conduits 38,40 and the inlet and discharge ports 28,32.

Figure 7:
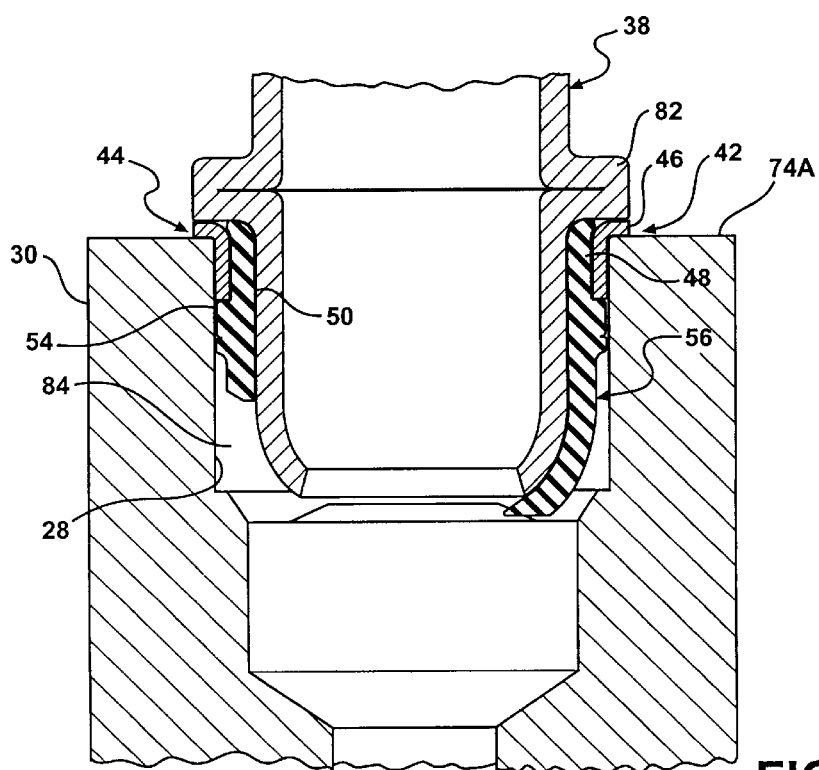
FIG. 7 is similar to FIG. 3 but showing the breakaway seal according to this invention after insertion of a fluid conduit into a tubular gasket thereof.
Figure 8:
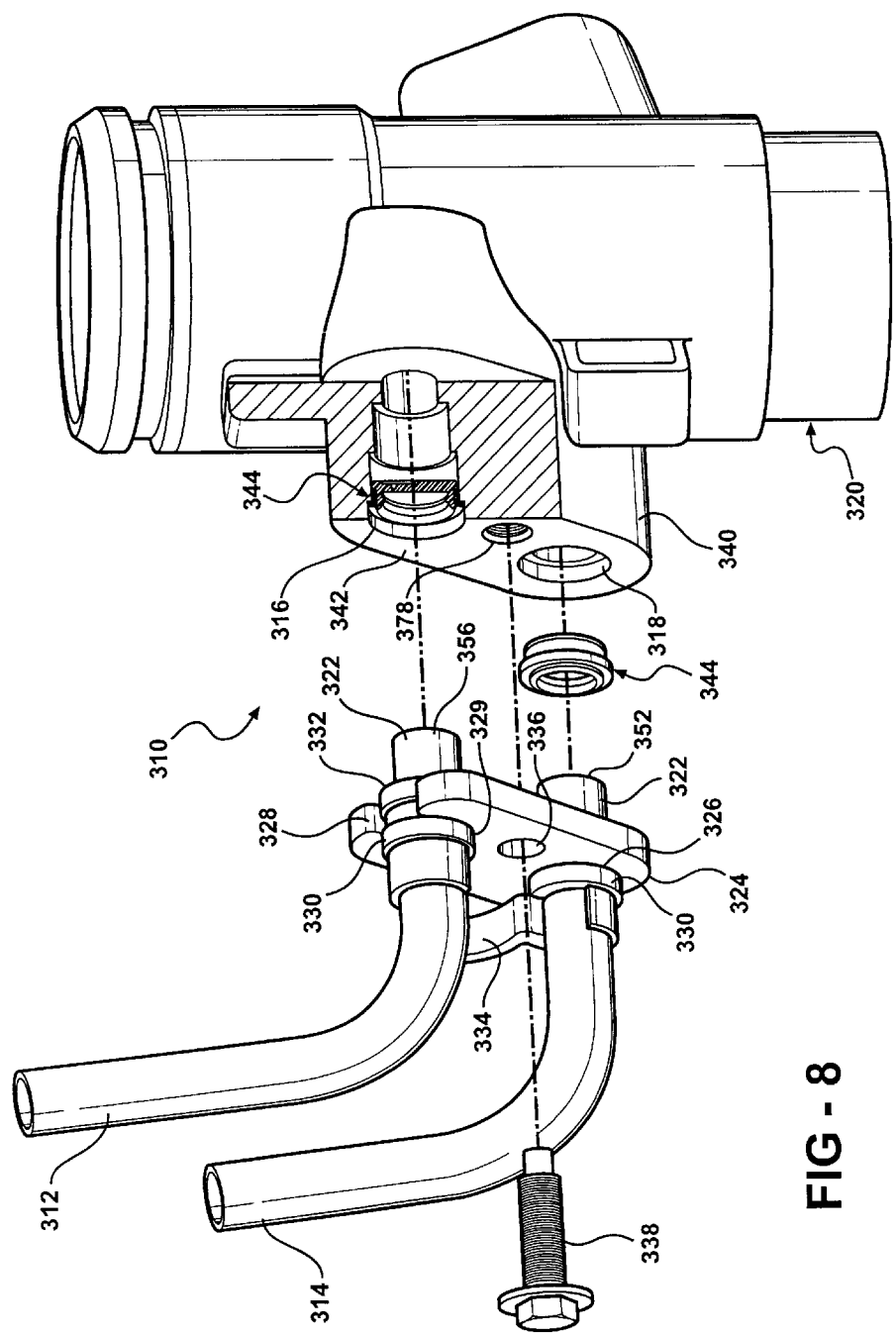
FIG. 8 is a fragmentary, partially dissembled, partially sectioned perspective view of a fluid sealing system constructed according to the invention.
Figure 9:
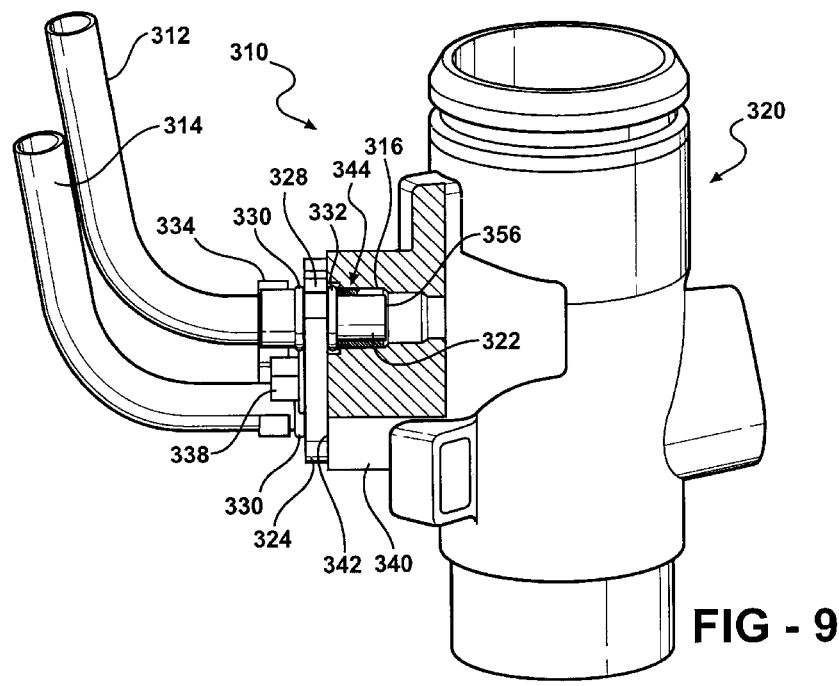
FIG. 9 is a perspective view similar to FIG. 8, but showing the seals and conduits installed in the housing.
Figure 10:
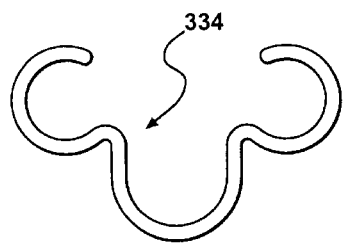
FIG. 10 is an enlarged plan view of a spring device of the present system.
Figure 11:
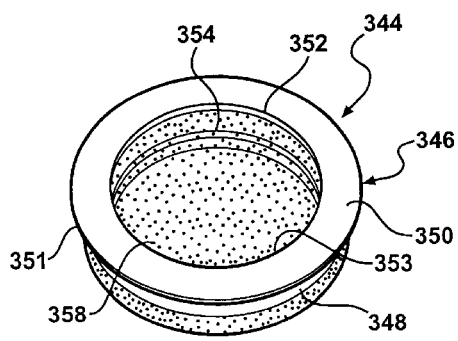
FIG. 11 is a perspective view of an alternative seal construction according to the invention.

After the integral membranes 56 rupture, the high and low pressure fluid conduits continue to penetrate the inlet and discharge ports until respective ones of a pair of annular flanges 82 on the fluid conduits seat on the flanges 46 on the metal carriers 44 of the breakaway seals 42, FIG. 7. Concurrently, the circular inner portions 66 of the integral membranes 56 fold down at the hinges 70 into annuluses around the fluid conduits, only an annulus 84 around the high pressure fluid conduit 38 being shown in FIG. 7. The ribs 72 further reinforce the hinges 70 against rupture to assure positive retention of the inner portions 66 in the annuluses. The resilient interface between the cylindrical inside wall 50 of each tubular gasket and the bead 52 thereon and the cylindrical outside wall 80 of the corresponding one of the high and low pressure fluid conduits seals against fluid leakage between the tubular gasket and the fluid conduit during and after insertion of the fluid conduits in the inlet and discharge ports. After the annular flanges 82 seat on the flanges 46 on the carriers 44 of the breakaway seals, dislodgment of the high pressure and low pressure fluid conduits from the inlet and discharge ports is prevented by mechanical retainers, not shown in this embodiment.

FIGS. 8–14 show an alternative fluid seal system 310 according to the invention particularly adapted for connecting multiple fluid conduits to a housing in a manner that supports the conduits prior to connection in a predefined parallel relationship fixed axially relative to one another, but permits a small amount of relative lateral movement to accommodate guidance and connection of the fluid conduits with corresponding openings in the housing, and further provides a seal system that enables the conduits to be sealed relative to the housing upon their insertion into the associated openings and retained in sealed relation by a minimum number of connecting features, and preferably a single fastener.

The illustrated example of FIGS. 8–14 shows two fluid conduits 312, 314 adapted for connection with corresponding openings or fluid ports 316, 318 of a housing 320 of a fluid power steering pump, which may be substituted, for example, for the pump housing 12 of FIG. 2.

The fluid conduits 312, 314 are fabricated preferably of metal tubing and have end sections 322 that are linear and positionable in parallel relation to one another. The end sections 322 are bridged by a rigid retaining plate 324 which may be fabricated from a rigid metal plate material. The retaining plate 324 is formed with a first opening 326 through which one of the fluid conduits 312 extends, and a slotted opening 328 in which the other fluid conduit 314 is received.

Each conduit 312, 314 is formed with a first shoulder 330 projecting radially outwardly of the conduit beyond the respective openings 326, 328 fixing the lines 312, 314 axially in one direction relative to the retaining plate 324. The shoulder 330 is preferably formed as a radially projecting upset portion of the metal conduits 312, 314 according to standard tube upsetting manufacturing practice. Each conduit 312, 314 is provided with a second shoulder 332 spaced axially from the first shoulder 330 on the opposite side of the retaining plate 324, so as to lock the conduits 312, 314 against axial movement in the opposite direction. The shoulders 332 are likewise preferably formed by an upsetting operation to provide a radial bulge in the fluid conduits 312, 314. In practice, the first upset 330 is formed on the conduits and the free ends of the conduits 312, 314 extended through their corresponding openings 326, 328 after which the second upsets 332 are formed to lock the conduits 312, 314 axially with respect to the retaining plate 324 and to fix them axially in predetermined relationship with respect to one another.

The opening 326 secures the fluid conduit 312 against any radial movement. However, the slotted opening 328 enables the other fluid conduit 314 to move laterally relative to the companion fluid conduit 312 while remaining fixed axially by virtue of the engagement of the upsets 330, 332 with respect to the opposite sides of the retaining plate 324 on either side of the slotted opening 328.

Preferably, the fluid conduits 312, 314 are biased toward one another by means of a retention spring 334 that is coupled to and extends between the fluid conduits 312, 314. The retention spring 334 may comprise a formed metal strap or molded plastic article having spring characteristics which, when the conduits 312, 314 are installed in their respective openings 326, 328, urge the movable fluid conduit 314 in the slotted opening 328 toward the other fixed fluid conduit 312 to the point where the fluid conduit 314 bottoms out in its slotted opening 328 against end wall 329. In this way, the fluid conduits 312, 314 remain secured to the retaining plate 324 despite the slotted opening feature, effectively bundling the plurality of fluid conduits together as one unit while enabling relative lateral movement therebetween against the force of the spring 334.

The retaining plate 324 is provided with at least one additional opening 336 which is preferably threaded and accommodates a corresponding fastener 338.

The pump housing 320 is formed with a projection or boss 340 having a planar clamping face 342 to which a plurality of hydraulic fluid openings or ports (two shown at 316 and 318) extend for communication with internal working components of the fluid pump. The ports 316, 318 of the invention are parallel and preferably identical in construction (including the same depth) for receiving the end portions 322 of the fluid conduits 312, 314, respectively. The fluid ports 316, 318 are adjacent to one another and have a fixed center-to-center lateral spacing.

Figure 12:
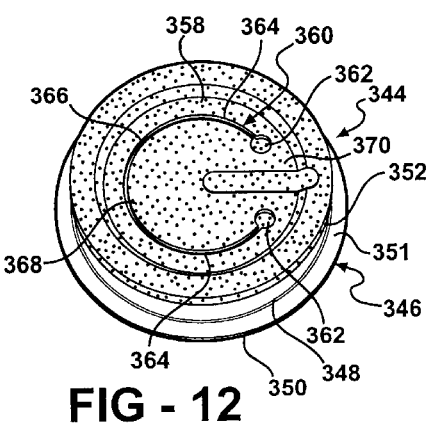
FIG. 12 is a view like FIG. 11 but of the opposite side of the seal.
Figure 13:
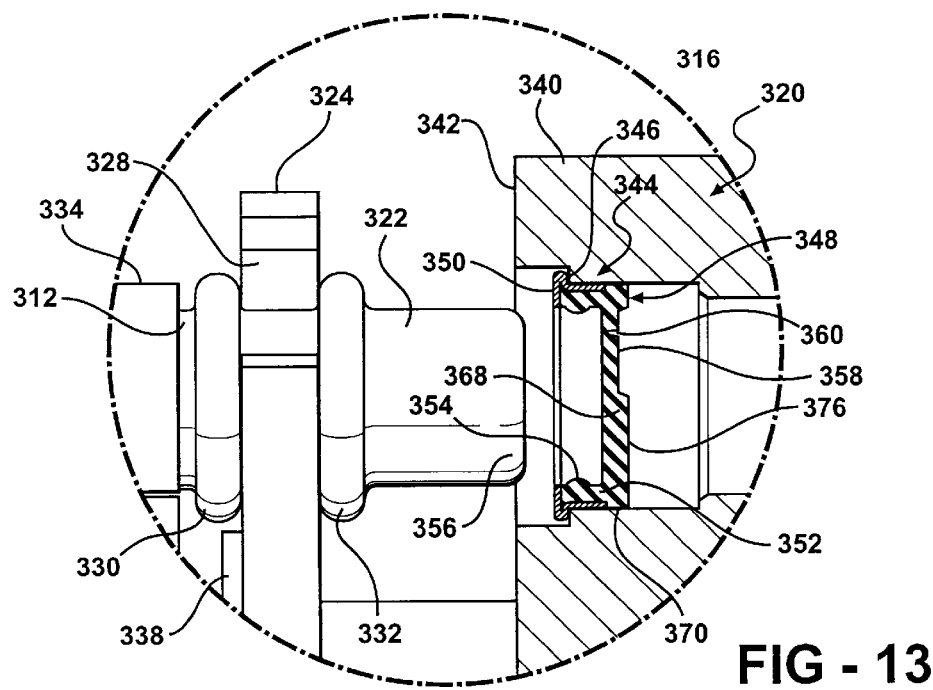
FIG. 13 is a fragmentary cross-sectional view of the fluid seal system prior to installation of the fluid conduits.
Figure 14:
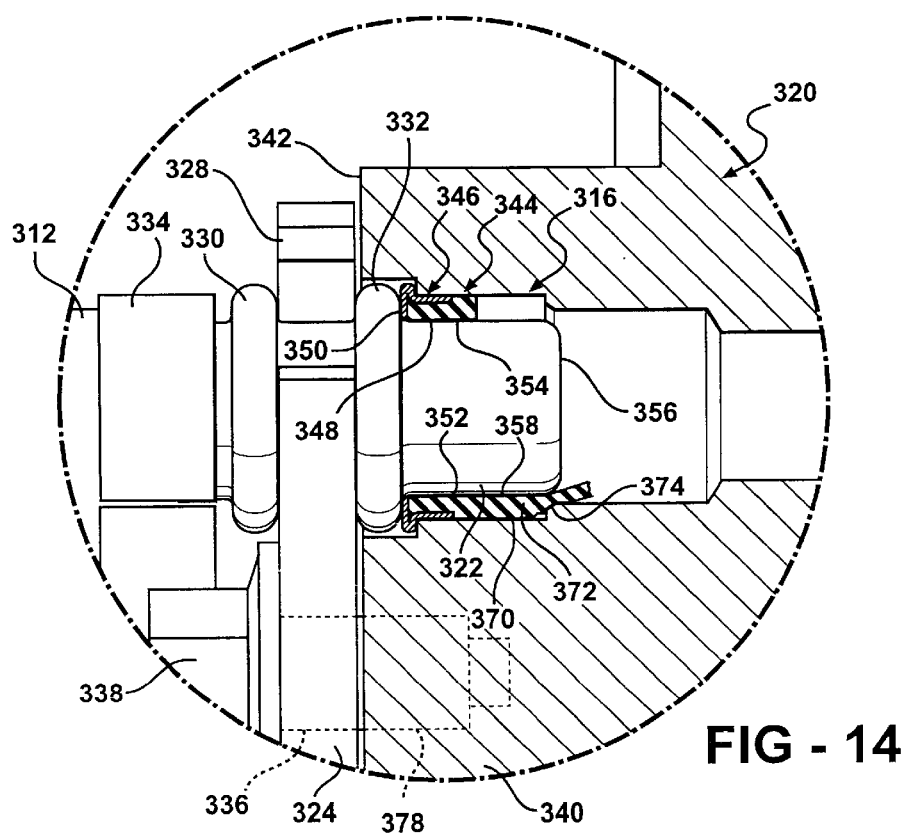
FIG. 14 is an enlarged view like FIG. 13 but showing the conduits installed.

Referring to FIG. 14, the ports 316, 318 have a stepped wall or profile for mounting associated seal members 344 and accommodating the insertion of the fluid conduits 312, 314 therein. The seals 344 comprise puncture port plug seals, the construction of which is best shown in FIGS. 11–14. Referring to those figures, the seal members 344 include an annular metal case 346 having a cylindrical body 348 and an upper flange or rim 350. The rim 350 projects radially outwardly of the body 348 presenting an annular shoulder 351 for mounting in the ports 316, 318, and further extends radially inwardly of the body 348 as well to provide a radial overhang portion 353. The rim 350 defines the mouth or insertion end of the seal member 344. Molded to the interior of the body 348 beneath the rim 350 is an elastic seal body 352. The seal body 352, which may be fabricated of HBNR, is formed with a radially inwardly projecting annular seal bead 354 that is spaced axially from the rim 350 and sized for sealing engagement circumferentially about a corresponding one of the fluid conduits 312, 314 when fully inserted. The bead 354 has a large support base which resists axial fatigue and tearing over prolonged operation. The bead profile is best shown in FIG. 13.

It will be seen that the seal body 352 has an upper end face 355 which lies substantially beneath the rim 350 and thus does not extend over the rim 350 or project substantially radially inwardly of the overhand portion 353 upstream of the bead 354 and is thereby shielded by the metal rim 350 from initial contact by the lines 316, 318 upon their insertion into the seal 344. The radially inwardly projecting portion 353 of the rim 350 thus serves to shield the seal body 352 and particularly the end face 355 against initial shearing forces that would otherwise be imparted to the seal body upon the insertion of the conduits 312, 314 which, if allowed to substantially engage the end face 355 at the opening, could peel the seal body material 352 away from the case 346. In this way, the metal rim 350 serves to align and guide the sealing end portions 322 of the fluid conduits 312, 314 into the seals 344, while protecting the seal body 352 against damage, and further serves as a radial stop to limit the amount of side loading imparted to the seal body 352 during operation due to metal-to-metal contact between the fluid conduits 312, 314 and the rim 350. It will be observed that the end portions 322 of the fluid conduits 312, 314 are of simple cylindrical construction and free of any formations, apart from a tapered or bullet nose end, to eliminate sharp edges of the tubes and to facilitate a tapered guidance thereof into the seals 344.

The seal body 352 is further formed with a tearable membrane 358 that extends across the seal body 352 and closes the opening at a location below the annular seal bead 354. The membrane 358 has a pre-weakened tear line or seam 360 formed by a thinned web of the seal body material that, when the fluid conduits 312, 314 are inserted into the seal members 344 tears under predetermined load to open the passage into the pump housing 320 to establish fluid communication between the conduits 312, 314 and the housing ports 316, 318. The membranes 358, prior to installation of the fluid conduits 312, 314, operate to close the ports 316, 318 preventing any debris from entering the interior of the pump housing 320 through the ports and thus effectively operate as functional shipping plugs.

The tear line 360 has a generally a C-shaped profile with enlarged end regions 362 that serve is tear limiters. The profile is preferably not truly C-shaped in the sense of the tear line 360 tracing a true partial circle, but rather compressed somewhat to truncate the width of the "C as shown in FIG. 12. More specifically, the tear line 360 has large diameter end sections or legs 364 that are close to the outer edge of the membrane 358 and lie along an arc of a circle, joined by a diametrically decreased elliptical-like midsection 366 that define, collectively, a central tear flap portion 368 of the membrane 358. A land region 370 between the tear limiters 362 serves as a hinge which, upon tearing of the membrane 358 along the tear line 360, retains the tear flap 368 secured to the membrane 358 so that it remains connected to the seal member 344. Provision of the elliptical midsection 366 effectively shortens the effective length of the tear flap 368, preventing the tear flap 368 from projecting too far into the passage once torn so as not to interfere with the operation of working components down line of the seal member 344, such as check valve (not shown).

FIG. 14 shows the seal member 344 after conduit insertion where it can be seen that the tear flap 368 is drawn with the fluid conduit 312 or 314 down into the fluid opening 316 or 318 and is trapped between the inserted end 322 of the fluid conduit in a corresponding stepped wall portion 372 of the ports 316 and 318. As shown, the wall portion 372 preferably steps inwardly adjacent a lower free end of the flap 368 to define a shoulder 374 which also engages and pins the tear flap 368 between it and the inserted fluid conduit end 322.

The membrane 358 is further formed with a reinforcement rib 376 comprising a thickened portion of the membrane extending radially between the tear limiting ends 362 of the weakened tear line 360. The reinforcement rib 376 serves to strengthen the hinge region 370 of the membrane so as to transfer initial loading to the tear line 360 to facilitate initial engineered tearing along the tear line 360, and further prevents any tear propagation from the tear limiter 362 from joining in a manner that would detach the tear flap 368 completely from the membrane 358. It will thus be appreciated that the tear limiters 362, the reinforcement rib 376, and the trapping of the torn flap 368 between the fluid conduits 312, 314 and walls of the openings 316, 318 assure that the flap 368, once torn, remains intact with the membrane 358 so as not to become detached and released into the pump housing 320.

In operation, the seal members 344 are seated in the counterbored ports 316,318 of the housing 320 and the fluid conduits 312, 314, assembled with the retaining plate 324 in the manner described above, are inserted together into their respective ports 316, 318 with the fluid conduit 314 being free to move laterally for precise center-to-center alignment with its associated opening 318. The end portions 322 of the conduits 312, 314 are forced against the membranes 358 of the corresponding seal members 344 causing them to tear as described, bringing the annular seal beads 354 into sealing engagement about the circumference of the inserted ends 322 of the fluid conduits 312, 314 (FIG. 14). The conduits 312, 314 are extended until the retaining plate 324 confronts the clamping face 342 of the housing boss 340. In this position, the fastener 338 is extended into a corresponding threaded opening 378 of the clamping face 342 and tightened to secure the retaining plate 324 and thus the fluid conduits 312, 314 to the housing 320. The simplicity of installation from a manufacturing standpoint will be appreciated. The lines can be connected with one hand and the fastener secured with the other using a simple power socket tool.

Figure 15:
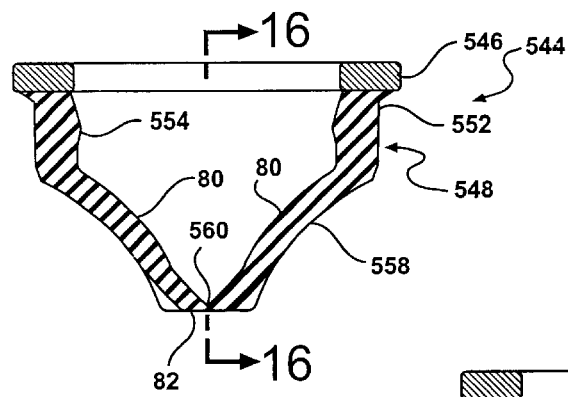
FIG. 15 is a cross-sectional view of a third alternative seal construction.
Figure 16:
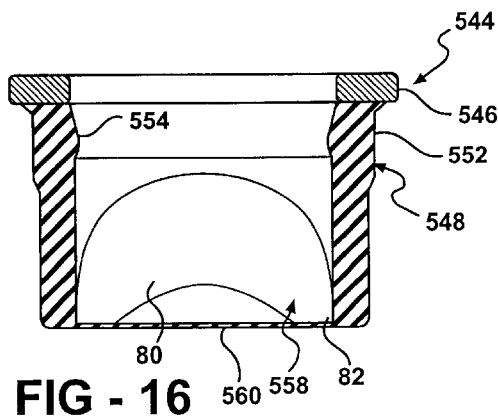
FIG. 16 is a cross-sectional view of the third alternative seal taken generally along lines 16—16 of FIG. 15.
Figure 17:
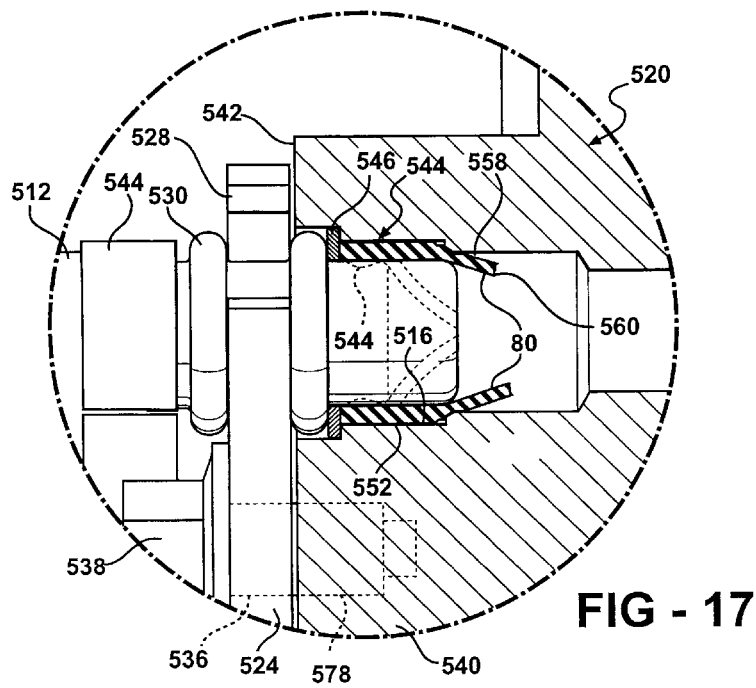
FIG. 17 is a view like FIG. 15 but showing the seal installed in the housing and the conduit shown partially inserted and fully inserted in the broken chain line and solid line positions, respectfully.

FIGS. 15–17 illustrate a fluid seal system 510 like that of system 310, but employing an alternative third embodiment of a seal 544. For convenience, the same reference numerals will be used to describe the features in common with the system 310, but in the 500 series of numbering.

The seal 544 includes a metal carrier 546 about which a seal body 548 is molded. The carrier 546 has preferably a ring or washer configuration and is generally uniform in thickness across its width, apart from rounded corners. The outer surface of the carrier 546 is sized for a press-fit installation within the ports 516, 518.

The seal body 548 includes a side wall or collar portion 552 extending from the bottom of the carrier 546 such that the carrier substantially covers or shields the collar portion 552 upon installation of the conduits 512, 514 in the same general manner as the carrier 346 of the second seal embodiment 344. Spaced axially below the carrier 546 there is formed an annular sealing bead 554 projecting radially inwardly from the collar portion 552 beyond the inner edge of the carrier 546.

A membrane 558 extends across and transitions into the lower region of the collar 552 to close off the opening of the seal 544. The membrane 558 has tapered or slanted walls 80 than extend from the collar portion 552 downwardly and inwardly in a direction axially away from the collar 552. The walls 80 are preferably generally planar and converge at a lower free end 82 of the seal body 548. As seen best in FIGS. 15 and 16, the lower end 82 has a generally peaked configuration and a width about the same as the width of the collar 552. The lower end 82 is formed with a pre-weakened tear seam 560 that extends the width of the end 82 between the inner wall surfaces thereof (FIG. 16).

As illustrated by the broken chain lines in FIG. 17, one advantage of this seal configuration is that the membrane 558 is spaced sufficiently from the sealing bead 554 to enable the bead 554 to make sealing contact with the conduit 512, 514 before the membrane 558 ruptures. In other words, the conduit 512, 514 passes through and seals with the bead 554 before exerting sufficient pressure on the membrane 558 to tear the seam 560.

Still referring to FIG. 17, the solid line position of the seal 544 and conduit 512 represent the system in the fully installed condition. The conduit 512 reacts against the walls 80 with sufficient separation force to tear the seam 560. As the conduit 512 moves past the separate walls 80, the walls 80 are each caused to displace outwardly and become trapped between the conduit and the wall of the port 516. In this case, the full thickness of the collar and wall material serves as the hinge.

The disclosed embodiments are representative of presently preferred forms of the invention, but are intended to be illustrative rather than definitive thereof. The invention is defined in the claims.

What is claimed is:

1. A fluid sealing system comprising:
   a fluid housing having at least two fluid ports disposed in fixed laterally spaced parallel relation to one another;
   a fluid seal disposed in each of said ports;
   at least two associated fluid conduits having distal ends extendible into said fluid ports in sealing engagement with said fluid seals;
   a retaining plate bundling said conduits in laterally spaced parallel relation to one another while permitting relative lateral movement of said conduits to enable said conduits to be installed together as a bundled unit with said housing while enabling adjustment in said lateral spacing of said conduits during installation to achieve matched alignment between said spacing of said ports and said spacing of said conduit, wherein said retaining plate is fixed to one of said conduits and includes an elongated slot accommodating the other of said conduits to enable said other conduit to slide in said slot relative to said retaining plate and thus move in said lateral direction relative to said fixed conduit; and
   a spring device acting on said movable conduit in such manner as to constantly urge said movable conduit along said slot laterally toward said fixed conduit with an applied spring force.

2. The system of claim 1 said slot includes an end wall which when confronted by said movable conduit defines a closest lateral spaced condition of said conduits.

3. The system of claim 2 wherein said force of said spring biases said moveble conduit toward engagement with said end wall of said slot.

4. The system of claim 2 wherein said slot includes an open end.

5. The system of claim 1 wherein said conduits are fixed axially relative to one another by said retaining plate.

6. The system of claim 5 wherein said conduits are each formed with axially spaced shoulders engaging opposite sides of said retaining plate.

7. The system of claim 1 wherein said retaining plate includes at least one fastener for securing said to said housing.

8. The system of claim 1 wherein said seals each comprise a rupture seal having a rupturable membrane which closes and seals said ports prior to installation of said conduits but which ruptures upon extending said conduits into said ports to establish fluid communication between said conduits and said ports, and an annular collar which sealingly engages said conduits.

9. The system of claim 8 wherein said membrane includes a preweakended tear seam.

10. The system of claim 9 wherein said seam is generally C-shaped defining a tear flap and a hinge.

11. The system of claim 10 wherein said hinge includes a thickened radial reinforcement rib.

12. The system of claim 11, wherein said generally C-shaped seam includes leg sections which lie along a trace of a common circle and an intermediate oval-shaped section which is set inwardly from the circle so as to truncate said tear flap in length.

13. The system of claim 8, wherein said seal includes an outer metal carrier member press-fit in said ports and an inner seal body of resilient material molded to said carrier.

14. The system of claim 13 wherein said carrier includes a cylindrical body and a lip formed at a mouth end extending radially outwardly and radially inwardly of said cylindrical body, said inwardly extending lip portion substantially covering and shielding said seal body at said mouth end of said seal body.

15. The system of claim 14 wherein said seal body includes an annular rib spaced axially from said lip of said carrier and extending radially inwardly of said lip.

16. The system of claim 8 wherein said membrane has a generally tapered configuration with tapered walls extending inwardly of said ports.

17. The system of claim 16 wherein said tapered walls converge at a pre-weakened tear seam.

18. The system of claim 16 wherein said tapered walls are generally planar and said tear seam is generally linear in configuration.

19. A rupturable membrane seal construction comprising:
a rigid annular carrier having an open end disposed about a longitudinal axis;
a seal molded to said carrier for installation within a fluid conveying port of a device to seal the port, said seal including an annular body extending axially away from said open end of said carrier and having an annular sealing lip for engaging and sealing about a tube inserted into said open end of said carrier; and
wherein said seal includes a rupturable membrane portion comprising at least a pair of tapered walls having Darallel interior and exterior surfaces extending axially away and radially inwardly of said annular sealing lip and conically converging to a linear peak presenting rupturable tear seam extending the width of said peak and spaced axially from said annular sealing lip and said annular body which is initially fused to close the port in which it is installed but rupturable upon application of a predetermined insertion force by the tube to open the port and establish fluid communication between the port and the tube.

20. The construction of claim 19 wherein said spacing between said annular sealing lip and said tear seam is sufficient to enable said sealing lip to seal about the inserted tube prior to rupturing of the tear seam.

21. The construction of claim 19 wherein said seal body terminates axially short of said open end of said carrier such that an exposed rim of carrier material is present at said open end.

22. A fluid sealing system comprising:
at least two fluid conduits having distal ends extendible into associated fluid ports of a housing;
a retaining plate extending between and engaging each of said fluid conduits at a location spaced axially from said distal ends, said retaining plate being fixed on said fluid conduits substantially against relative axial movement on said conduits, said retaining plate including a laterally extending slot supporting at least one of said fluid conduits for lateral movement relative to the other of said fluid conduits while maintaining said retaining plate in said axially fixed relationship with said fluid conduits; and
a spring device separate from said retaining plate acting on said movable fluid conduit to constantly urge said movable fluid conduit along said slot laterally toward the other of said fluid conduits.

23. A fluid sealing system comprising:
a fluid housing having at least two fluid ports disposed in fixed laterally spaced parallel relation to one another;
a fluid seal disposed in each of said ports;
at least two associated fluid conduits having distal ends extendible into said fluid ports in sealing engagement with said fluid seals; and
a retaining plate bundling said conduits in laterally spaced parallel relation to one another while permitting relative lateral movement of said conduits to enable said conduits to be installed together as a bundled unit with said housing while enabling adjustment in said lateral spacing of said conduits during installation to achieve matched alignment between said spacing of said ports and said spacing of said conduits,
wherein said retaining plate is fixed to one of said conduits and includes an elongated slot accommodating the other of said conduits to enable said other conduit to move in said lateral direction relative to said fixed conduit, and
wherein said slot includes an end wall which when confronted by said movable conduit defines a closest lateral spaced condition of said conduits;
further including a spring that biases said movable conduit toward engagement with said end wall of said slot.

24. The system of claim 23 wherein said slot includes an open end.

* * * * *